(12) United States Patent
Vogel et al.

(10) Patent No.: US 7,646,451 B2
(45) Date of Patent: Jan. 12, 2010

(54) ILLUMINATION DEVICE

(75) Inventors: Uwe Vogel, Dresden (DE); Joerg Andreas, Dresden (DE); Joerg Amelung, Dresden (DE)

(73) Assignee: Fraunhofer-Gesellschaft Zur Foerderung der Angewandten Forschung E.V., Munich (DE)

( * ) Notice: Subject to any disclaimer, the term of this patent is extended or adjusted under 35 U.S.C. 154(b) by 344 days.

(21) Appl. No.: 11/425,941

(22) Filed: Jun. 22, 2006

(65) Prior Publication Data

US 2007/0096125 A1 May 3, 2007

(30) Foreign Application Priority Data

Jun. 24, 2005 (DE) .................. 10 2005 029 431

(51) Int. Cl.
*G02F 1/1335* (2006.01)
(52) U.S. Cl. ........................... 349/70; 349/15
(58) Field of Classification Search .......... 349/70, 349/15
See application file for complete search history.

(56) References Cited

U.S. PATENT DOCUMENTS

| 5,965,907 | A | 10/1999 | Huang et al. |
| 6,825,985 | B2 | 11/2004 | Brown et al. |
| 7,420,637 | B2 * | 9/2008 | Imai et al. ................... 349/122 |
| 2001/0030320 | A1 | 10/2001 | Budd et al. |
| 2002/0075566 | A1 | 6/2002 | Tutt et al. |
| 2004/0164292 | A1 | 8/2004 | Tung et al. |
| 2005/0007517 | A1 | 1/2005 | Anandan |
| 2005/0162440 | A1 | 7/2005 | Kleen |
| 2006/0221284 | A1 * | 10/2006 | Yata et al. ................... 349/119 |

FOREIGN PATENT DOCUMENTS

| DE | 10 2004 004 296 A1 | 8/2005 |
| EP | 0 262 955 A2 | 4/1988 |
| JP | 2004077778 A | 3/2004 |
| JP | 2005077437 A | 3/2005 |
| WO | 2004/068190 A2 | 8/2004 |
| WO | 2005/011293 A1 | 2/2005 |

* cited by examiner

*Primary Examiner*—David Nelms
*Assistant Examiner*—David Y Chung
(74) *Attorney, Agent, or Firm*—Daniel J. Santos

(57) ABSTRACT

An illumination device has a plurality of main illumination areas subdivided into at least a first and a second sub-illumination area, wherein a luminous element for outputting radiation is arranged on each sub-illumination area, and wherein a beam deflection unit is associated with each main illumination area, which is designed to deflect the radiation output by the luminous element of the first sub-illumination area into another direction than the radiation output by the luminous element of the second sub-illumination area.

39 Claims, 8 Drawing Sheets

——— beam path of the light to the right eye lens
– – – – beam path of the light to the left eye lens
········ suppressed beam of light to the right eye lens
············ suppressed beam of light to the left eye lens --- light beam to right eye
— light beam to left eye ——— beam path of the light to the right eye lens
- - - - beam path of the light to the left eye lens
········ suppressed beam of light to the right eye lens
············ suppressed beam of light to the left eye lens

ILLUMINATION DEVICE

CROSS-REFERENCE TO RELATED APPLICATION

This application claims priority from German Patent Application No. 10 2005 029 431.6, which was filed on Jun. 24, 2005, and is incorporated herein by reference in its entirety.

BACKGROUND OF THE INVENTION

1. Field of the Invention

The present application relates to an illumination device, such as it may be used for 3D LCD flat image displays (LCD=liquid crystal display) with desired autostereoscopic properties in the form of an OLED backlight.

2. Description of the Related Art

Based on luminous elements, such as OLEDs (organic light emitting diode), novel flat displays and/or flat image displays with many advantages may be realized. These advantages are the large-area deposition of, for example, the organic substances on various substrates and the self-luminous properties of the displays, thus allowing very thin displays.

Here, solutions for non-adaptive, passive backlight applications of OLEDs for LC displays (liquid crystal displays) are applied in the displays.

U.S. Pat. No. 5,965,907 teaches a backlight based on an OLED for liquid crystal applications. The backlight includes a first OLED multi-layer structure capable of emitting light in a red frequency spectrum, a second OLED multi-layer structure adjacent to the first OLED multi-layer structure and capable of emitting light in a green frequency spectrum, and a third OLED multi-layer structure adjacent to the second OLED multi-layer structure and capable of emitting light in a blue frequency spectrum. A liquid crystal display is put on the top face of the light-emitting device. The device may be used as color image display in portable electronic appliances.

US 2005/007517 A1 teaches the use of an OLED backlight integrated in a liquid crystal display. The liquid crystal display has three substrates, wherein one of the three substrates is associated with the OLED and the liquid crystal display. The common substrate has two surfaces, one of the two surfaces having a transparent electrode, a polarization filter and an adaptation layer for the liquid crystal element. This one of the two surfaces is opposite to the top substrate of the liquid crystal display having the same layers. A thin liquid crystal film is located between the two substrates. The second surface of the common substrate has an active organic layer including an anode and a cathode and is opposite to the bottom substrate of the OLED backlight. The two faces of the common substrate are hermetically sealed with respect to the two other substrates of the liquid crystal display and the OLED. When the organic light-emitting diode is activated as backlight, the light it generates is launched into the liquid crystal display.

US 2004/0164292 A1 shows a device that comprises a first electrode including a reflective material and a second electrode located above the first electrode and having a translucent material. An organic layer comprising a light-emitting material is located between the first electrode and the second electrode. A light-modulating element is located above the second electrode. The first electrode may be implemented as the only effective reflective layer in the device, or the first and the second electrode and the organic layer are located above the light-modulating element, and the second electrode is reflective, while the first electrode is non-reflective.

Color displays may be produced by the use of color filters. There may be used OLEDs emitting a broad light spectrum, such as white light, or emitting light of a single color or light of various colors.

US 2001/0030320 A1 shows an OLED device capable of using light transmitted from the side. The OLED device includes an OLED comprising a substrate surface and having side faces for the emission of photons. Furthermore, the OLED device comprises at least one light-bundling means adjacent to the OLED, which bundles the emitted light so that the deflected light is parallel to the light emitted from the surface of the substrate.

However, none of the known devices is suited to adjust the direction of the light emitted from a display. Particularly, none of the known OLED arrangements can provide an indication of an electronically controllable functionality of an OLED backlight application and its realization to be able to actively generate desired autostereoscopic effects for a 3D display.

SUMMARY OF THE INVENTION

It is the object of the present invention to provide an illumination device allowing a directed area emission of light in various directions with little effort.

In accordance with a first aspect, the present invention provides a pixel array having an illumination device having a plurality of main illumination areas subdivided into at least a first and a second sub-illumination area, wherein a luminous element for outputting radiation is arranged on each sub-illumination area, and wherein a beam deflection unit is associated with each main illumination area, the beam deflection unit being designed to deflect the radiation output by the luminous element of the first sub-illumination area into another direction than the radiation output by the luminous element of the second sub-illumination area; wherein the main illumination area is subdivided into one or more main pixel areas, and correspondingly each sub-illumination area is subdivided into one or more sub-pixel areas, such that one of the luminous elements for outputting radiation is arranged on each sub-pixel area, and that one of the beam deflection units is associated with each main pixel area to deflect the radiation output by the luminous element of the first sub-pixel area of the respective main pixel area into another direction than the radiation output by the luminous element of the second sub-pixel area of the respective main pixel area; wherein, behind the plurality of the beam deflection units in the emission direction, there is arranged a transmitting unit having an array of modulation pixels and being controllable to selectively transmit the radiation output by the luminous element to adjust the intensity of the transmitted radiation; and wherein exactly one main pixel area is associated with each modulation pixel and vice versa.

In accordance with a second aspect, the present invention provides an illumination device having a plurality of main illumination areas subdivided into at least a first and a second sub-illumination area, wherein a luminous element for outputting radiation is arranged on each sub-illumination area, and wherein a beam deflection unit is associated with each main illumination area, the beam deflection unit being designed to deflect the radiation output by the luminous element of the first sub-illumination area into another direction than the radiation output by the luminous element of the second sub-illumination area.

The present invention is based on the finding that an area illumination may be achieved with little effort, if a plurality of beam deflection means is associated with a plurality of main illumination areas, and a light beam output by a luminous element arranged in a first sub-illumination area of a respective main illumination area is deflected in another direction than a light beam output by a luminous element arranged in a second sub-illumination area. A use of movable elements is thus not required, thus reducing the effort.

Thus, illumination devices may be provided whose main illumination areas emit light into different directions in a directed way, depending on the fact in which of the sub-illumination areas associated with the main illumination area a luminous element outputs radiation.

The illumination devices may then be used in a pixel array and/or may be implemented as a pixel array having main pixel areas subdivided into several sub-pixel areas, wherein a luminous element is arranged at each sub-pixel area. A beam deflection means may be associated with the main pixel area so that the light output by a luminous element in a sub-pixel area is deflected into another direction than the light output by a luminous element in another sub-pixel area.

Thus, the picture points and/or images emitted by a pixel array may be changed in their emission direction by deliberate driving of the different sub-pixel areas associated with a main pixel area. For example, the position of an observer may be determined by an "intelligent" sensor arrangement, and subsequently the emission direction of an image emitted by the pixel array may be adapted to the position of the observer and particularly to his or her eye position.

This allows to produce, for example, pixel arrays used in display systems offering an observer the possibility to perceive three-dimensional image impressions without the observer needing further external appliances, such as glasses or the like, for the display of the three-dimensional image. The luminous elements arranged in the sub-pixel areas of the main pixel areas are used as an intelligent adaptive backlight. By suitable superposition of two two-dimensional stereo sub-images respectively emitted toward an eye of the observer, the display may thus give an observer, for example, the impression of a three-dimensional image.

Advantageously, a so-called user-adaptive tracking may be performed, wherein the position of a user is determined by an intelligent sensor means together with a control means, and subsequently the backlight is adjusted so that the user perceives a three-dimensional image in various positions in which he or she is located at the moment. The tracking subsystem may perform electronic switching of the, for example, structured luminous elements and thus perform the tracking of the preferably three-dimensional image and/or the two two-dimensional stereo sub-images to the changing observer locations without requiring a mechanically moved part, microoptics located in front of the display or electronically controllable optics.

The functionality of an implemented tracking single user system may actively control the desired illumination angles and/or the angles at which the light beams are emitted from the pixel array with respect to, for example, the liquid crystal display layer, so that the angles may be adjusted so that a separate image may result in the direction of the two eyes of an observer. Thus, an intelligent adaptive backlight in a display is the basis for a tracking sub-system allowing an adaptation of the emission angle of an image to a position of an observer. The same principle also applies to multi-user systems as will be explained further below.

Advantageously, the control means implemented here may be designed so that the display may also be operated in a normal 2D display mode. This implementation and/or the switching between 2D and 3D display modes is possible, for example, purely on the software side, so that the same hardware may be used for a 2D mode display and for a 3D mode display. At the same time, adaptations to various resolutions and dimensions of a base display may be performed due to the switchability and scalability of the backlight system, allowing a flexible use of the pixel array and the displays in which the pixel array is used.

In an embodiment of the present invention, the luminous elements arranged in the sub-pixel areas may be implemented in the form of emitting strip structures. In connection with a lens raster array allowing an adjustment of a deflection angle of the light emitted by the emitting strip structures, there may thus be implemented optimized controllable light sources. The emitting strip structures may be implemented as drivable OLED structures, so that the results are adaptivity, scalability and switchability of the backlight of a display.

Driving of the OLED backlight strips by a control means that activates the OLED structures, for example, so that they output a light beam may be done in a pulsed way, wherein a pulse-shaped current is applied to the OLEDs, or continuously.

Furthermore, a suitable RGB structuring and/or red-green-blue structuring of the OLED strips and/or structures in full-color displays may allow an efficient and directed sub-pixel illumination for the separation of the interlaced stereo sub-images. An RGB structuring is a pixel structure in which a so-called superpixel is composed of three sub-pixels with the three primary colors red, green and blue located adjacent to each other. In the eye of the observer, the colored picture points generated by them are mixed, so that a picture point with any color may be generated in the eye of the observer. Thus, a use of intensity-reducing RGB color filters and/or red-green-blue color filters in front of a liquid crystal display pixel matrix may be avoided to change the color of the picture points.

Advantageously, in monochrome displays and/or displays with monochrome backlight and color filters using OLEDs as backlight, the OLED layer of the backlights may be implemented in an unstructured and/or continuous way, so that the strip-shaped OLED emission faces and/or OLED emitter faces result only from the structuring of one of the two electrodes, while the other one of the two electrodes itself may be continuous and/or unstructured and transparent. The color displays with monochrome backlight may be realized by the use of color filters that may also be combined with polarization filters.

The pixel arrays according to an embodiment of the present invention, however, may not only be used in so-called autostereoscopic single user systems generating a 3D image perceived as three-dimensional by an observer, but may also be used in so-called multi-user systems generating several 3D images and/or stereo sub-images for several observers. In other words, a display in which such a pixel array is used may cause a three-dimensional image for several observers who are in different positions with respect to the pixel array. The luminous elements in different sub-pixel areas associated with a sub-pixel area are driven so that always two stereo sub-images are emitted to each observer by means of a pixel array according to an embodiment of the present invention of the display. The observers perceive the two stereo sub-images as a three-dimensional image. A pixel and/or main pixel with which a plurality of the sub-pixel areas is associated may be driven so that, at the same time, it generates a picture point of a first stereo sub-image in the right eye of a first observer and the right eye of the second observer, so that the resolution of the three-dimensional image in the multi-user system is as high as that in the single user system.

BRIEF DESCRIPTION OF THE DRAWINGS

Preferred embodiments of the present invention will be explained in more detail below with respect to the accompanying drawings, in which.

DESCRIPTION OF THE PREFERRED EMBODIMENTS

Figure 1:
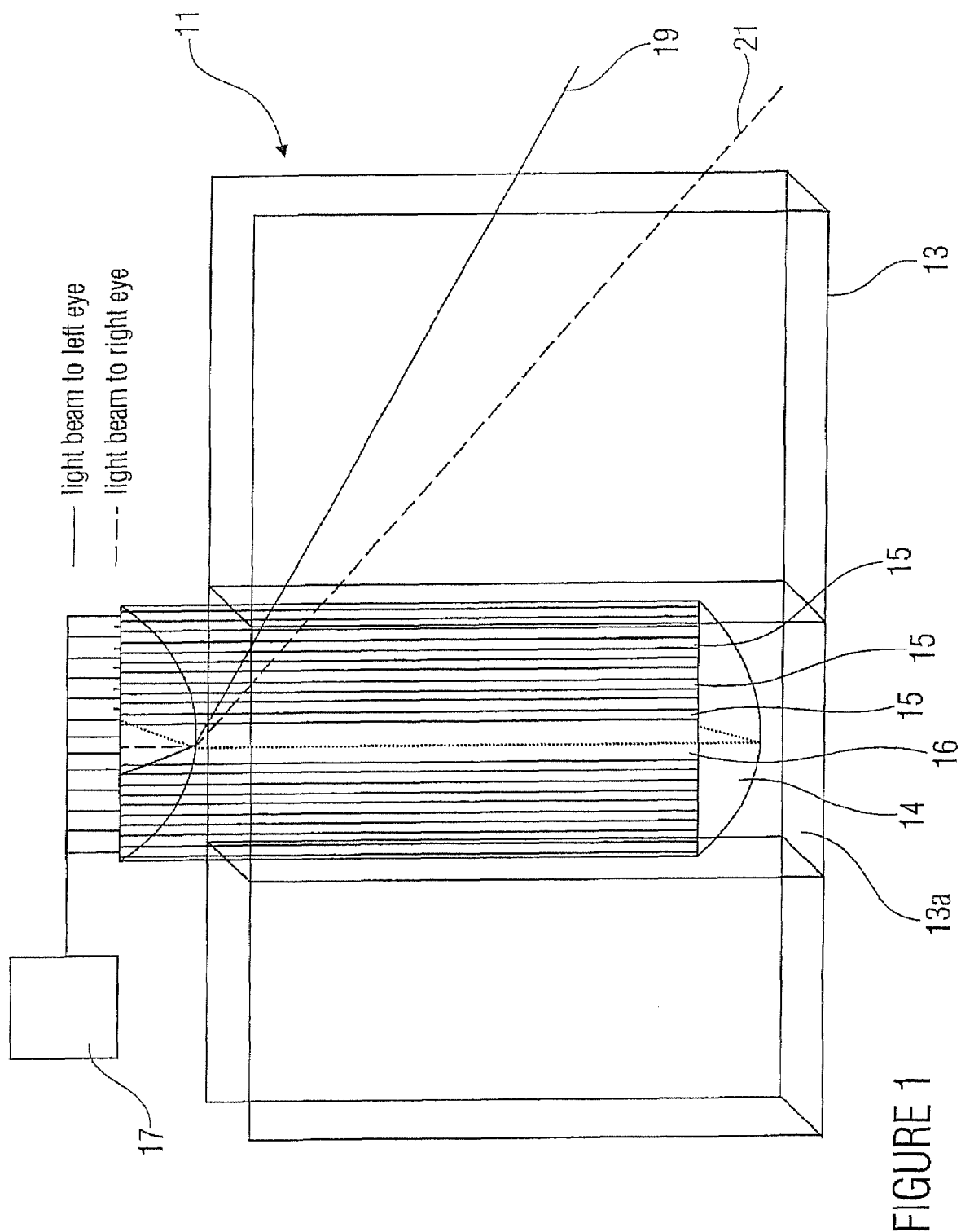
FIG. 1 is a schematic view of a section of a liquid crystal display with a pixel array according to an embodiment of the present invention.

FIG. 1 shows a schematic view of a section of a display 11 having a pixel array according to an embodiment of the present invention. The display comprises a liquid crystal element 13, a lens and/or a lens strip 14, activated OLED strips 15, a region 16 having sub-pixel areas in which the OLED strips are not activated, and control means 17. The liquid crystal element 13 is subdivided into modulation pixels 13a. The display 11 emits a first light beam 19, whose course is represented by a solid line, to a right eye of an observer not shown here. At the same time, a course of a path is shown that would be followed by a light beam 21 from an OLED strip in the sub-pixel area in the region 16 to a left eye of the observer. An OLED strip is located in each of the sub-pixel areas in the region 16. The OLED strips in the region 16 are deactivated, so that the light beam with the course 21 is suppressed.

The lens 14 is located in front of the activated OLED strips in the sub-pixel areas in the observer direction. The liquid crystal display 13 having the modulation pixels 13a is located in front of the lens 14 in the observer direction.

The control means 17 is electrically connected to each of the OLED strips, i.e. both to the activated OLED strips shown here and to the OLED strips in the sub-pixels in region 16 not shown here, via a line bus.

In the display 11 shown in FIG. 1, the control means 17 drives the OLED strips so that the OLED strips 15 causing a picture point in the right eye of the observer are activated. At the same time, it drives the OLED strips that would cause an image in the left eye of the observer in the sub-pixel areas in region 16 so that they are deactivated. The light beams output by the OLED strips are deflected differently by the partial and/or hemicylinder-shaped lens 17, i.e. for example a lens in the form of a cylinder segment, so that the light beams 19, 21 output by OLED strips in different sub-pixel areas are deflected differently.

A sensor arrangement determining a position of the right eye and the left eye of the observer may be associated with the control means 17. The control means 17 may subsequently determine sub-pixel areas with the OLED strips that are deactivated, so that the left eye of the observer does not perceive any image, even if he or she moves. At the same time, it may determine the sub-pixel areas with the OLED strips that are activated, based on information from the "intelligent" sensor arrangement, so that the right eye of the observer perceives a picture point.

A driving means not shown here may change a transmission behavior of the modulation pixels 13a of the liquid crystal element 13 modulation pixel-wise, and thus adjust the intensity of the light causing a picture point in the right eye of the observer. Thus, the image perceived by the eye may be changed only by a change of the transmission behavior of the liquid crystal element 13. A change in the intensity of the light of the light beam output by the activated OLED strip having the course 19 by the control means 17 to achieve a change in the brightness of the picture point is thus not necessary. In other words, the activated OLED strip 15 emits the light with an unchanged intensity as long as the observer and/or the right eye of the observer remains in the same position.

The activated OLED strips are thus used here as an active backlight for displays, such as stereoscopic displays, whose operation is based on light-modulating elements, such as liquid crystal elements. These displays are based on liquid crystal elements and are highly independent of an angle of view of the observer and highly efficient.

In FIG. 1, only a section having a main pixel area of one color from the pixel array according to an embodiment of the present invention is shown. A plurality of the main pixel areas are arranged side by side in the pixel array. The OLED strips in the sub-pixel areas associated with the main pixel areas may then be driven so that a stereo sub-image is caused in one eye of the observer, respectively. A backlight system implemented in that way may be used to cause a three-dimensional image for the observer by making him or her perceive two stereo sub-images in the right and in the left eye. The perception of these two stereo sub-images results in the observer perceiving the composite image as a 3D image.

Figure 2:
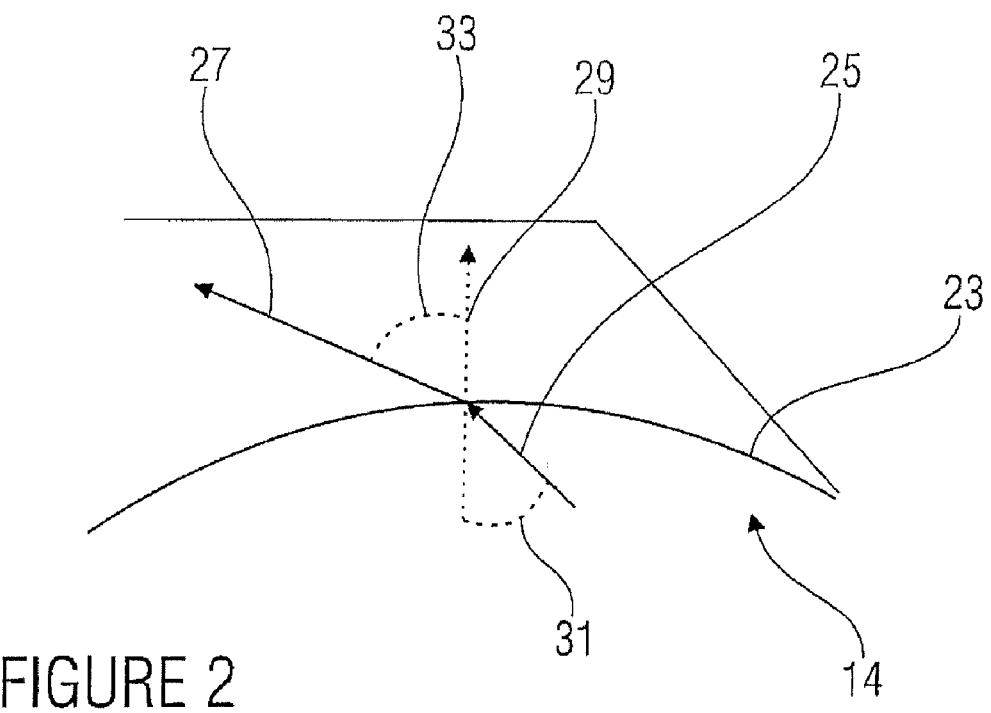
FIG. 2 is an explanation of the operation of the beam deflection means used in a pixel array according to an embodiment of the present invention.

FIG. 2 explains the principle of the lens 14 used in the display 11. In the following, the same or equally operating elements are provided with the same reference numerals. The lens 14 has a surface 23. An incident light beam whose course is indicated by arrow 25 passes from the lens 14 from a first optical medium to a second optical medium at an exit point on the surface 23 of the lens 14. An exiting light beam whose course is given by arrow 27 is refracted away from a perpendicular 29 onto the surface 23 of the lens 14. This applies when the first optical medium and/or the lens 14 has a higher refractive index than the second optical medium, which is located in the area above the lens 14 and in which the exiting beam 27 propagates.

The incident beam 25 and the perpendicular 29 onto the surface 23 enclose an angle of incidence 31, while the exiting beam 27 and the perpendicular 29 enclose an angle of exit 33. According to Snell's law of refraction, what applies at the interface of two media having a different refractive index is that the angle of incidence 31 is smaller than the angle of exit 33, if the refractive index of the first optical medium in which the incident beam 25 propagates is higher than the refractive index of the second optical medium in which the exiting beam 27 propagates. Conversely, the exiting beam 27 is refracted towards the perpendicular 29, if the second optical medium is denser than the first optical medium.

The angle of incidence and/or the angle enclosed by the incident beam and a perpendicular onto the surface 23 of the lens 14 varies depending on a location of the exit point or, in other words, on the position of the point on the surface 23 of the lens 14 at which the light beam passes from the first optical medium of the lens 14 into the second optical medium surrounding the lens 14. Thus, a change of the exit angle 33 is possible via a change of the position of the exit point at which the incident light beam 25 impinges on the surface 23 of the lens 14.

Figure 3:
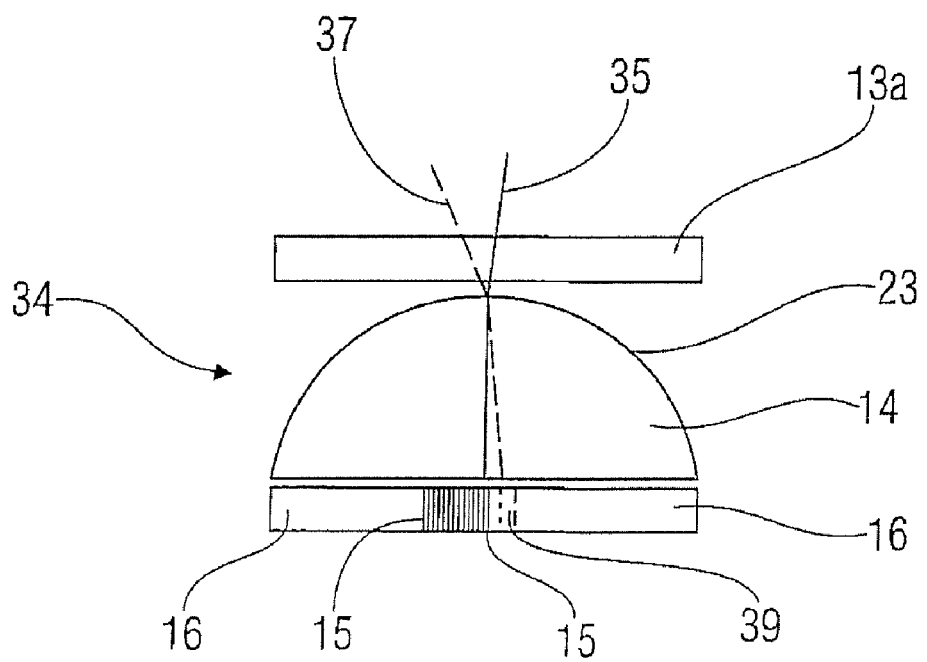
FIG. 3 is a schematic side view of a main pixel area used in a pixel array according to an embodiment of the present invention to generate a picture point in an eye of an observer.

FIG. 3 explains an operation of a main pixel area 34 in a pixel array according to an embodiment of the present invention shown in FIG. 1. The structure of the main pixel area has already been explained above. Also, it still applies that the control means 17 not shown in FIG. 3 is electrically connected to each OLED strip in each sub-pixel area.

In the main pixel area 34, there are represented the activated OLED strips 15, which here, for example, have a blue emission spectrum, wherein the activated OLED strips 15 output light beams causing a blue picture point in the eye of the observer. A light beam having a course 35 causing a picture point in the left eye of the observer is represented by a solid line. At the same time, a course 37 that would be taken by a light beam from a sub-pixel area 39 to the right eye of the observer is illustrated by a dashed line.

The control means 17 activates the OLED strip in the sub-pixel area in which the light beam having the course 35 is generated. The light beam having the course 35 to the left eye of the observer is subsequently output from the activated OLED strip 15 and refracted at the surface 23 of the lens 14. Thus, it is deflected so that it impinges on the left eye of the observer not shown here and generates a blue picture point there.

At the same time, an OLED strip in the sub-pixel area 39 that would cause a light beam having the course 37 to the right eye of the observer is not activated. This is because only a picture point in the left eye of the observer is to be caused with the main pixel area 34 shown here. The same also applies to the remaining OLED strips outside the activated OLED strips 15. Thus, only the OLED strips 15 causing a picture point in the left eye of the observer are activated in the main pixel area 34 shown in FIG. 3.

Figures 4A, 4B:
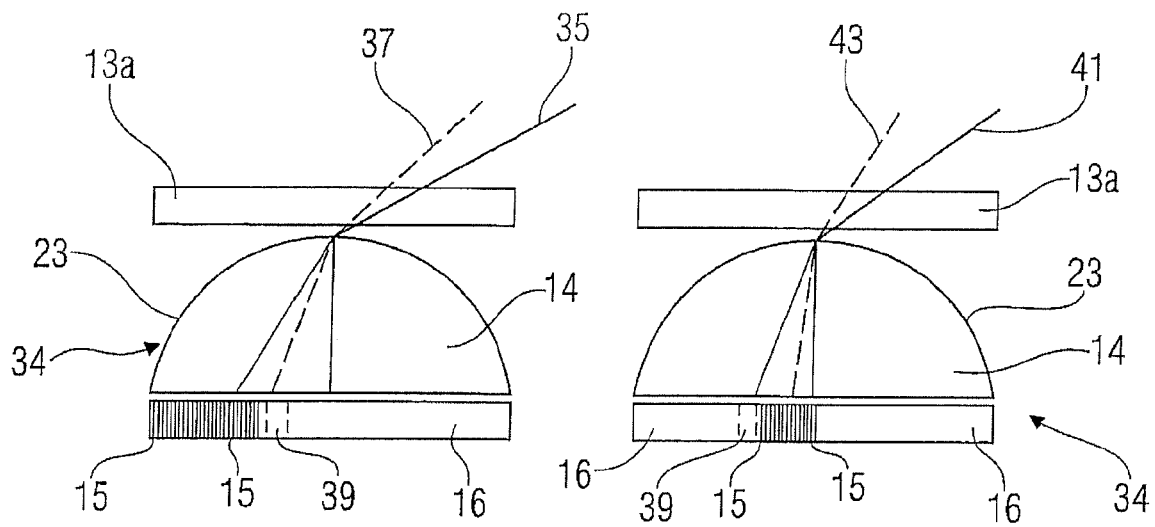
FIGS. 4a-b are a comparison of two main pixel areas causing a picture point in a right and a left eye of an observer.

FIGS. 4a-b show a comparison of the two main pixel areas 34, wherein the main pixel area 34 shown in FIG. 4a causes a picture point, here for example a green picture point, in the left eye of the observer, and the main pixel area 34 shown in FIG. 4b causes a picture point, here for example a red picture point, in the right eye of the observer.

In FIG. 4a, the control means 17 drives the OLED strips in the sub-pixel areas so that the activated OLED strips 15 are arranged so that the light beams output by them are refracted in the lens 14 so that they cause a picture point in the left eye of the observer. By way of example, a solid line shows the course 35 of the light beam from the activated OLED strip 15 to the left eye of the observer. There is also shown the course 37 of a path that would be followed by the light beam from the sub-pixel area 39 to the right eye of the observer. The OLED strip in the sub-pixel area 39 is not activated so that no picture point is generated in the right eye of the observer by the main pixel area 34 shown in FIG. 4a.

On the other hand, FIG. 4b shows a main pixel area 34 generating a picture point in the right eye of the observer and not generating any picture point in the left eye of the observer. A course 41 of a path that would be followed by a light beam 41 to the left eye of the observer is illustrated by a solid line. A course 43 of a light beam to the right eye of the observer is shown by a dashed line. The control means 17 activates the OLED strips 15 in the sub-pixel areas arranged so that the radiation output by them is deflected to the right eye of the observer. At the same time, the remaining OLED strips in the sub-pixel areas 39 arranged so that their radiation is not deflected to the right eye of the observer are not activated by the control means 17.

Figures 5A, 5B:
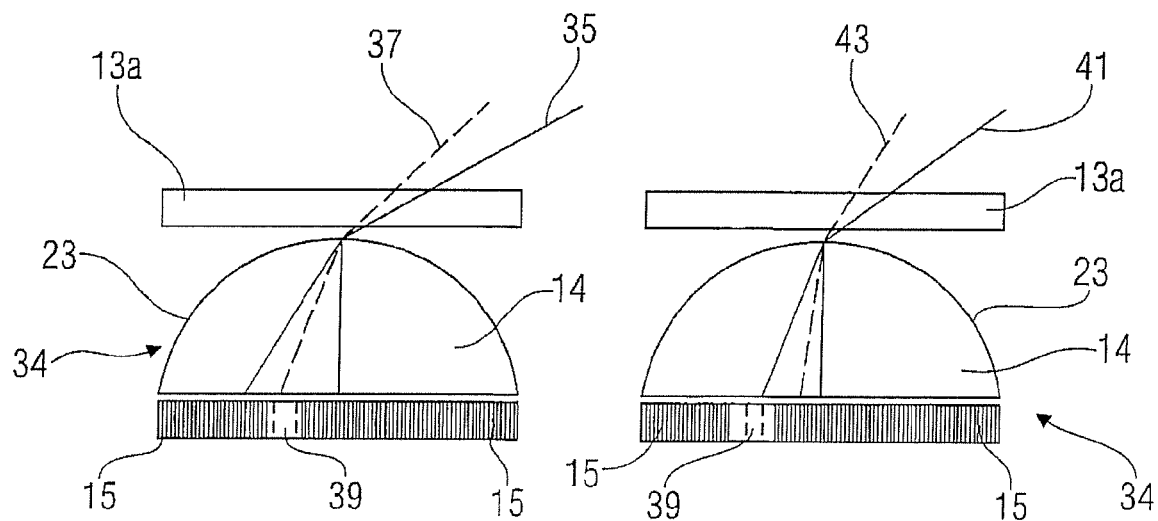
FIGS. 5a-b are a comparison of two main pixel areas in each of which a sub-pixel area causing a picture point in an eye for an observer is suppressed.

FIGS. 5a-b show a comparison of the two main pixel areas 34, wherein one eye of the observer is suppressed. The main pixel area 34 in FIG. 5a generates a picture point in the left eye of the observer, while the main pixel area 34 in FIG. 5b generates a picture point in the right eye of the observer.

The difference of the comparison of the main pixel areas 34 shown in FIGS. 5a-5b with respect to the comparison of the main pixel areas 34 shown in FIGS. 4a-b is that the control means 17, in the main pixel areas 34 shown in FIGS. 5a-b, deactivates the OLED strips located in the sub-pixel areas 39 from which a light beam would be emitted to the eye of the observer that is to be suppressed. Thus, in FIG. 5a, an OLED strip in the sub-pixel area 39 is deactivated that would output a light beam having the course 37 to the right eye of the observer so that no picture point is generated in the right eye of the observer by the main pixel area 34 shown in FIG. 5a. In other words, this means that the OLED strips in the sub-pixel area 39 are deactivated so that a picture point in the right eye of the observer is suppressed.

At the same time, in the main pixel area 34 shown in FIG. 5a, the light beam having the course 35 to the left eye of the observer causes a picture point in the left eye of the observer, because the OLED strip in the sub-pixel area generating the light beam having the course 35 is not deactivated.

In FIG. 5b, the OLED strips in the sub-pixel area 39 are deactivated by the control means 17 so that a picture point that would be generated by the light beam having the course 41 in the left eye of the observer is suppressed. However, a light beam having the course 43 to the right eye of the observer, that generates a picture point, here for example a red picture point, in the right eye of the observer, is output from the non-deactivated OLED strip 15.

By the deactivation of the OLED strips in the sub-pixel areas, an increase in the spatial integral light yield of the display is possible by the electronically controlled displacement of a blanked window instead of an adjustment of the active strips. In this way, the portion of the respective pixel and/or picture point emitted onto one eye is suppressed, respectively. Thus, a significantly larger percentage of the backlight is active improving the integral luminance across the display area.

Figure 6:
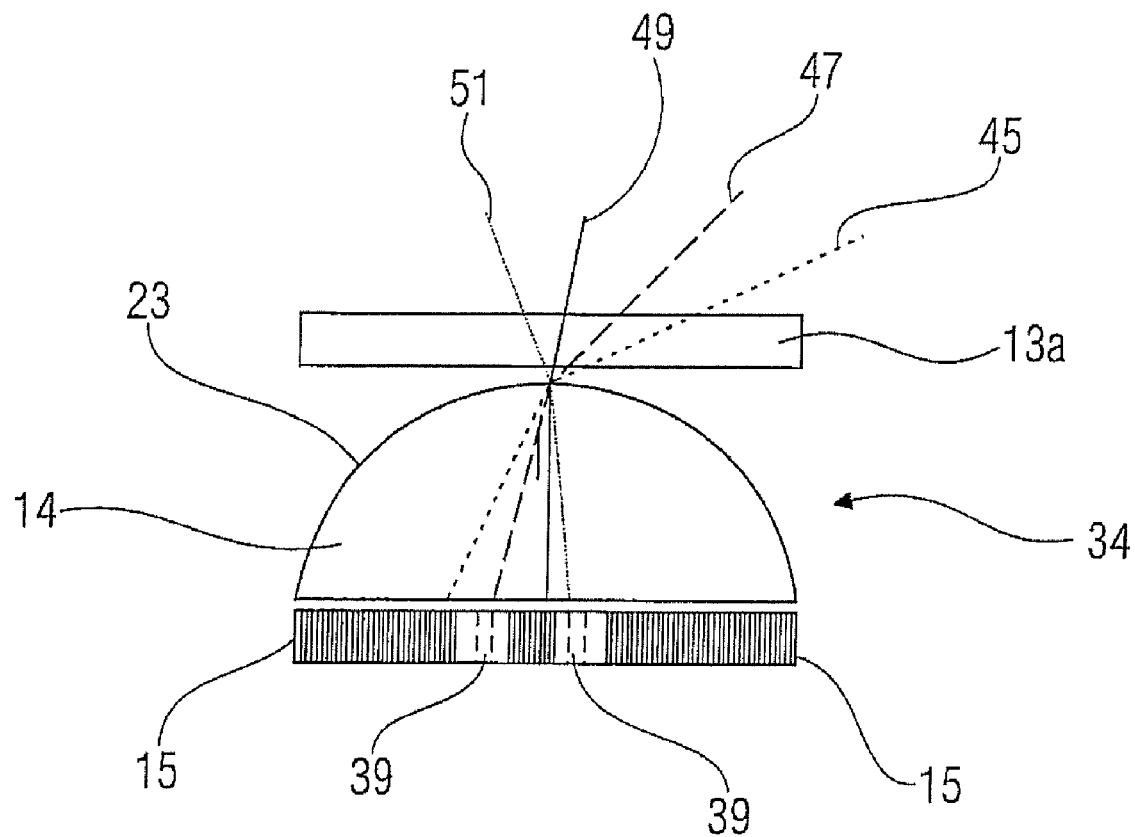
FIG. 6 is a schematic view of a main pixel area in a pixel array according to an embodiment of the present invention used in a multi-user system.

In FIG. 6, the operation of the main pixel area 34 is shown for a so-called multi-user system. In the main pixel area 34, a beam path 45 to the left eye of the first observer is indicated by a line of small circles. A beam path 47 to the right eye of the first observer is drawn as a dashed line, while a beam path 49 to the left eye of the second observer is shown as a solid line and a beam path 51 to the right eye of the second observer is shown as a dotted line.

The main pixel area 34 is driven by the control means 17 so that a picture point is generated in the left eye of the first observer and in the left eye of the second observer, respectively. Thus, the light beam to the right eye of the first observer according to the beam path 47 and the light beam according to the beam path 51 to the right eye of the second observer are suppressed and/or the OLED strips in the sub-pixel areas 39 from which these beams would be output are deactivated by the control means 17 not shown in FIG. 6. As the OLED strips 15 shown in FIG. 6 have, for example, a blue emissions spectrum, a blue picture point is generated in the left eye of the first observer and in the left eye of the second observer, respectively.

Figure 7A:
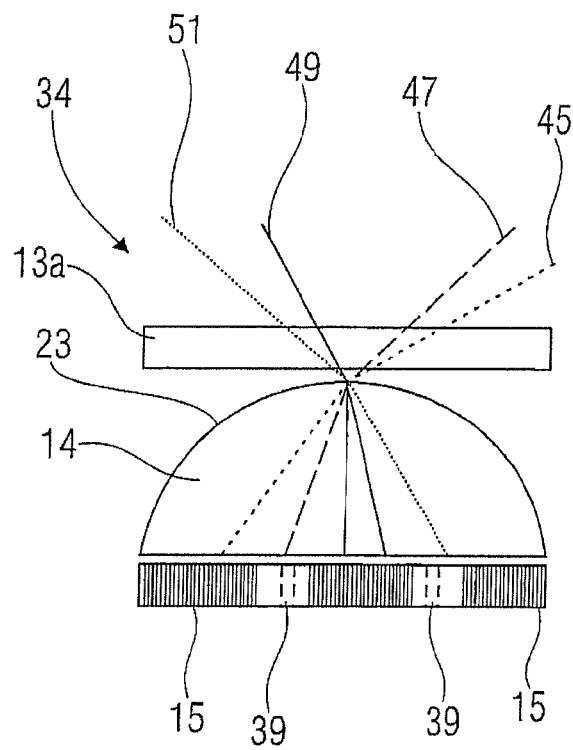
FIGS. 7a-b are a comparison of two main pixel areas causing a picture point in a left eye of two observers and in a right eye of two observers, respectively.
Figure 7B:
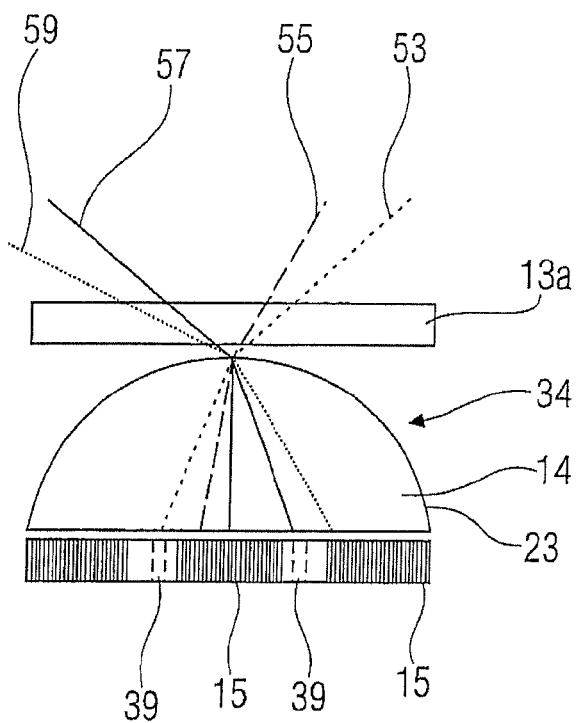

FIGS. 7a-b show a comparison of the main pixel areas for the generation of a light point in the left eye of the first and the second observer and the right eye of the first and the second observer, respectively. In FIG. 7a, a picture point is suppressed in the right eye of the first and the second observer, respectively, and in FIG. 7b, a picture point in the left eye of the first and the second observer is suppressed, respectively.

FIG. 7a illustrates the course 45 of the light beam to the left eye of the first observer by small circles, while the course 47 of a suppressed light beam to the left eye of the first observer is drawn as a dashed line. The course 49 to the left eye of the second observer is illustrated by a solid line, while the course 51 of the suppressed light beam to the right eye of the second observer is illustrated by a dotted line. The control means 17 not shown deactivates the OLEDs that would output the light beam to the right eye of the first observer and to the right eye of the second observer in the sub-pixel areas 39 so that the picture points in the right eye of the first observer and the right eye of the second observer associated with the main pixel area 34 shown in FIG. 7a are suppressed. The luminous elements in the remaining sub-pixel areas are not deactivated by the control means. Thus, the OLED strips 15 outputting the light beam to the left eye of the first observer and to the left eye of the second observer are not deactivated. Thus, a picture point, here for example a green picture point, is generated in the left eye of the first observer and in the left eye of the second observer, respectively.

FIG. 7b illustrates a course 53 of a suppressed light beam to the left eye of the first observer by circles, while a course 55 of a light beam to the right eye of the first observer is drawn as a dashed line. A course 57 of a suppressed light beam to the left eye of the second observer is illustrated by a solid line, while a course 59 of the light beam to the right eye of the second observer is illustrated by a dotted line.

In FIG. 7b, the control means 17 deactivates the OLED strips in the sub-pixel areas 39 that would generate a picture point in the left eye of the first observer and in the left eye of the second observer, respectively. Thus, by the deactivation of the OLED strips, a picture point that would have been generated by the main pixel area 34 in the left eye of the first observer and in the left eye of the second observer is suppressed.

Conversely, the remaining OLED strips 15 are not deactivated by the control means 17. Thus, those OLED strips in the sub-pixel areas are not deactivated either that output the light beam with the course 55 to the right eye of the first observer and the light beam with the course 59 to the right eye of the second observer, so that a picture point, here for example a red picture point, is generated in the right eye of the first observer and in the right eye of the second observer, respectively. Thus, the right eye of the first observer and the right eye of the second observer each perceive a red picture point. The intensity of the red picture points perceived by the right eye of the first observer and by the right eye of the second observer may be adjusted by a suitable modulation of the transmission property of the modulation pixel 13a.

The principle explained here allows to provide main pixel areas used in a display and/or in a pixel array allowing several users to observe a three-dimensional image. Several users of a display using the pixel array with the main pixel areas shown in FIGS. 7a-b may perceive a different group of picture points in the right eye and in the left eye, respectively, by suitable driving of the respective main pixel areas 34. Suitable driving of the OLED strips in the respective main pixel areas 34 allows that two stereo sub-images are caused in the right eye and the left eye of the observers, so that the two observers each perceive a three-dimensional image.

Advantageously, the control means 17 not shown here may be provided with an "intelligent" sensor system allowing a determination of the position of the first and the second observer and/or a determination of the position of the left eye of the first observer, the right eye of the first observer, the left eye of the second observer and the right eye of the second observer. The control means then drives the OLED strips arranged in the respective main pixel areas 34 so that the corresponding stereo sub-images are caused in the right eye and the left eye of the first and the second observer, respectively. The directed emission takes place in several directions, such as towards the eyes of the first observer and towards the eyes of the second observer, only by a deliberate electronic selection and/or driving of the respective OLED strips and/or backlight strips. The resolution may be maintained with respect to single user systems, so that there is no resolution reduction.

Figure 8:
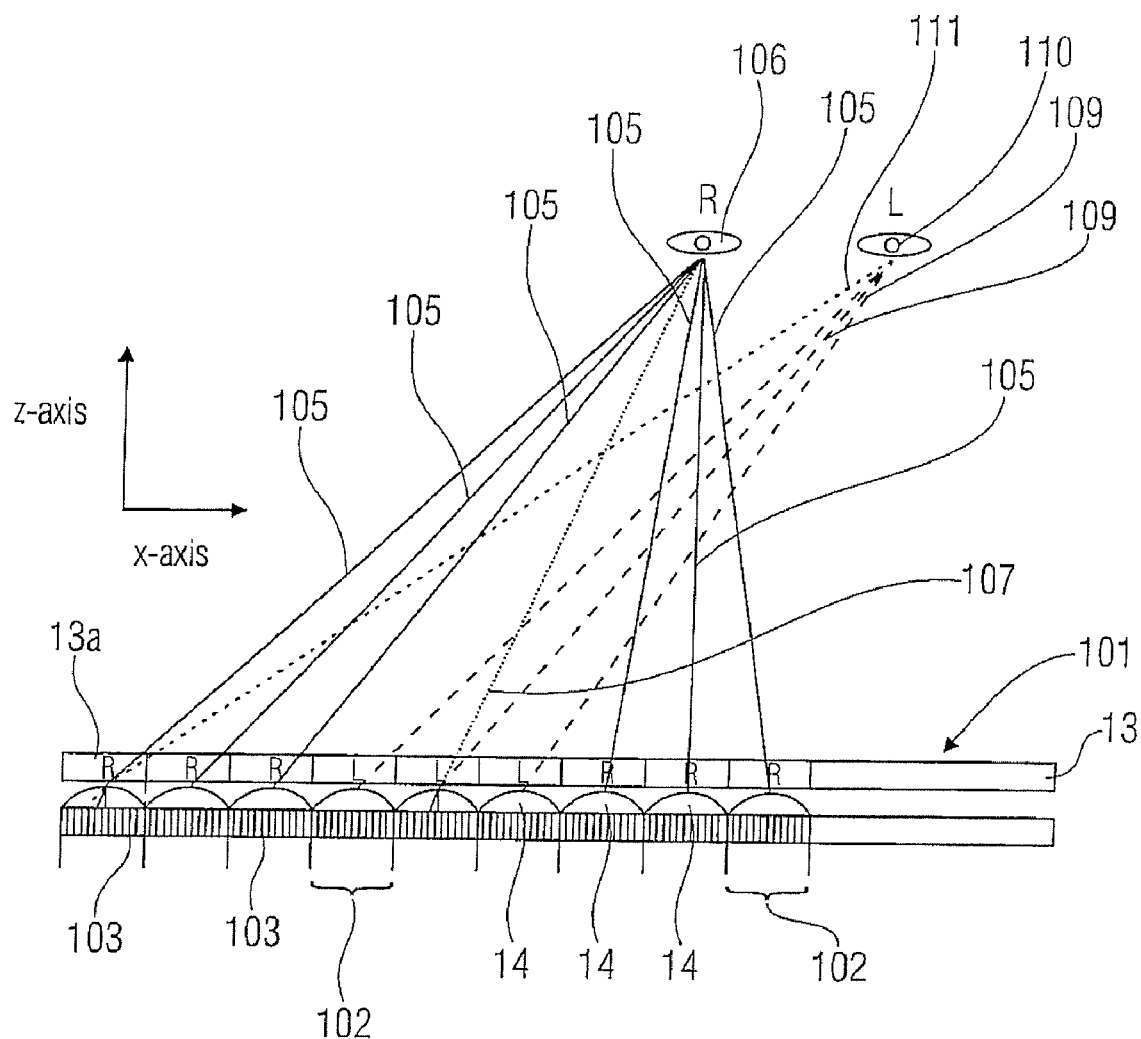
FIG. 8 is a schematic view of the pixel array according to an embodiment of the present invention causing a three-dimensional color image for an observer.

FIG. 8 shows a pixel array 101 causing the perception of a color image for an observer. The pixel array 101 comprises the liquid crystal element 13 having the modulation pixels 13a, the lenses 14, main pixels 102 and sub-pixels 103.

The main pixel 102 is subdivided into an amount and/or plurality of the sub-pixels 103. In the observer direction, the lens 14 is arranged in front of each main pixel 102. Also in the observer direction, the modulation pixel 13a is always arranged in front of the lens 14, so that the modulation pixel 13a is associated with each main pixel 102. All OLED strips in the sub-pixel areas, wherein an OLED strip is arranged in each sub-pixel area, are electrically connected to a control means not shown here, which is designed to activate and/or deactivate the OLED strips, so that the OLED strips output a light beam and/or do not output a light beam. The pixel array 101 emits light according to beam paths 105 to a right eye lens 106 of the observer. The beam paths 105 are illustrated by a solid line. A light beam from the main pixel 102 to the right eye lens 106 according to a beam path 107 illustrated by a dashed line is suppressed, because the main pixel 102 is provided to generate a picture point in a left eye lens of the observer.

Furthermore, the pixel array 101 emits light beams along beam paths 109 to a left eye lens 110 of the observer, respectively. A light beam according to a beam path 111 from the main pixel 102 to the left eye lens of the observer is suppressed. A control means not shown here activates and/or deactivates an OLED strip respectively arranged in the sub-pixel area 103. For this purpose, the control means determines an x coordinate and a z coordinate of the left eye lens of the observer and the right eye lens of the observer and/or of a right eye of the observer or a left eye of the observer, respectively. Then, it may determine, for example via a software routine, either directly the sub-pixel areas in which the OLED strips are to be activated, or it determines an angle enclosed by a perpendicular onto the plane in which the main pixels 102 are arranged, and/or the pixel array plane, and a line through the respective eye lens and a point of the main pixel. The determination of the angle is preferably done individually for each main pixel 102 and/or each main pixel area 34 not shown here in the pixel array. Depending on the determined angle, the control means determines the sub-pixel 103 in which an OLED strip arranged there outputs a light beam directed to the right eye lens 106 and/or to the left eye lens 110 in the pixel array 101.

The light beam output by the activated OLED strip is deflected by the lens 14 to the right 106 and/or to the left 110 eye lens of the observer.

As the light beams output by different OLED strips in different sub-pixel areas are each deflected differently by the lens 14, a light beam propagating to the right eye lens or to the left eye lens of the observer may thus be generated deliberately by the selection of the sub-pixel 103 in which the light beam is output by the OLED strip. Thus, by the activation and/or deactivation of OLED strips in the respective sub-pixels 103, an emission behavior of the main pixels 102 may be adjusted so that the light beams generated by them propagate towards the right eye lens 106 of the observer or the left eye lens 110 of the observer.

By the modulation of the transmission behavior of the modulation pixels 13a in the liquid crystal element 13 performed by a driving means not shown here, the intensity of the light in the respective light beams may be modulated suitably so that, by the modulation of the intensity of the light propagating through the modulation pixels 13a, the observer may perceive a plurality of picture points consecutive in time and/or a time image sequence with different brightness in the right eye lens 106 and the left eye lens 110, respectively.

By suitably driving the OLED strips in the respective main pixel areas 102, the observer may perceive different images in the right eye lens and in the left eye lens, respectively. These different images may be selected so that they are, for example, two-dimensional stereo sub-images of a three-dimensional image, so that the observer perceives a three-dimensional image.

At the same time, it is possible to suppress picture points by not activating and/or deactivating the OLED strips arranged in the sub-pixel areas from which the output light beam would propagate towards the right eye lens of the observer in a main pixel whose picture point is to be suppressed in the right eye lens. The same applies to the suppression of a picture point in the left eye lens.

Advantageously, the main pixels 102 respectively belonging to a superpixel are arranged side by side in a row of the main pixels 102. The superpixels preferably have three main pixels that can emit light of the colors green, blue and red. In the perception of the observer, the colors of the three main pixels of the superpixel mix, so that thus any color may be adjusted in the perception of the picture point.

In other words, in the pixel array shown in FIG. 8, all main pixels 102 associated with a superpixel are arranged side by side, so that the superpixel-wise arrangement of the main pixels is not broken up and/or maintained.

The 3D backlight system explained in FIG. 8 refers to the areas of application and/or potentials of an adaptive OLED backlight consisting of red-green-blue strip structures that may be integrated in a liquid crystal display to generate autostereoscopic effects. The electronically controllable functionality of the OLED backlight allows an LCD operated in the transmitted light method the angle-selective separate provision of the freely observable stereo sub-images necessary for autostereoscopic seeing.

In addition, a lens and/or a microoptical layer and/or a so-called lenticular sheet that may optically support and/or optimize the angle-selective illumination of the liquid crystal display sub-pixels may be used between the organic emitter structures and the LCD. By a suitable design of the control means, as explained above, the behavior of the display explained here may be adapted with respect to movements of the observer.

The spatially controllable light emission of the illumination source offers decisive advantages as compared to the methods, for example, of a mechanical manipulation and/or change of the behavior of microoptics. The electronically manipulatable, adaptive light emission from the backlight allows an adaptation of the illumination source to a moving user/observer that is finer by several orders of magnitude and a significantly more efficient light yield with respect to the observation angle.

The use of special OLED structures is the basis for the functioning of this novel backlight system. The separately drivable OLED structures preferably arranged in strips allow the deliberate turning on and/or off of certain OLED strip amounts, depending on what is given by the feedback via the tracking subsystem of an observer-adaptive display that may perform a determination of a position of an observer and particularly his/her eye position.

Red-green-blue OLED strip rasters are formed in vertical direction throughout the necessary backlight area. Deliberately turning on and/or off individual or several strip amounts changes the visibility of the sub-pixel depending on the observation angle, wherein the light points of the sub-pixels are generated by the separately illuminated OLED structures. The structuring of the OLED strips may be performed according to the red-green-blue sub-pixel arrangement in liquid crystal displays, as shown in FIG. 8.

The pixel array shown in FIG. 8 may be used in 3D displays based on so-called LC TFT panels (liquid crystal thin film transistor panels). In them, a pixel matrix of liquid crystal elements is modulated pixel-wise in its transmission behavior by pixel-wise driving of the thin film transistors.

Figure 9:
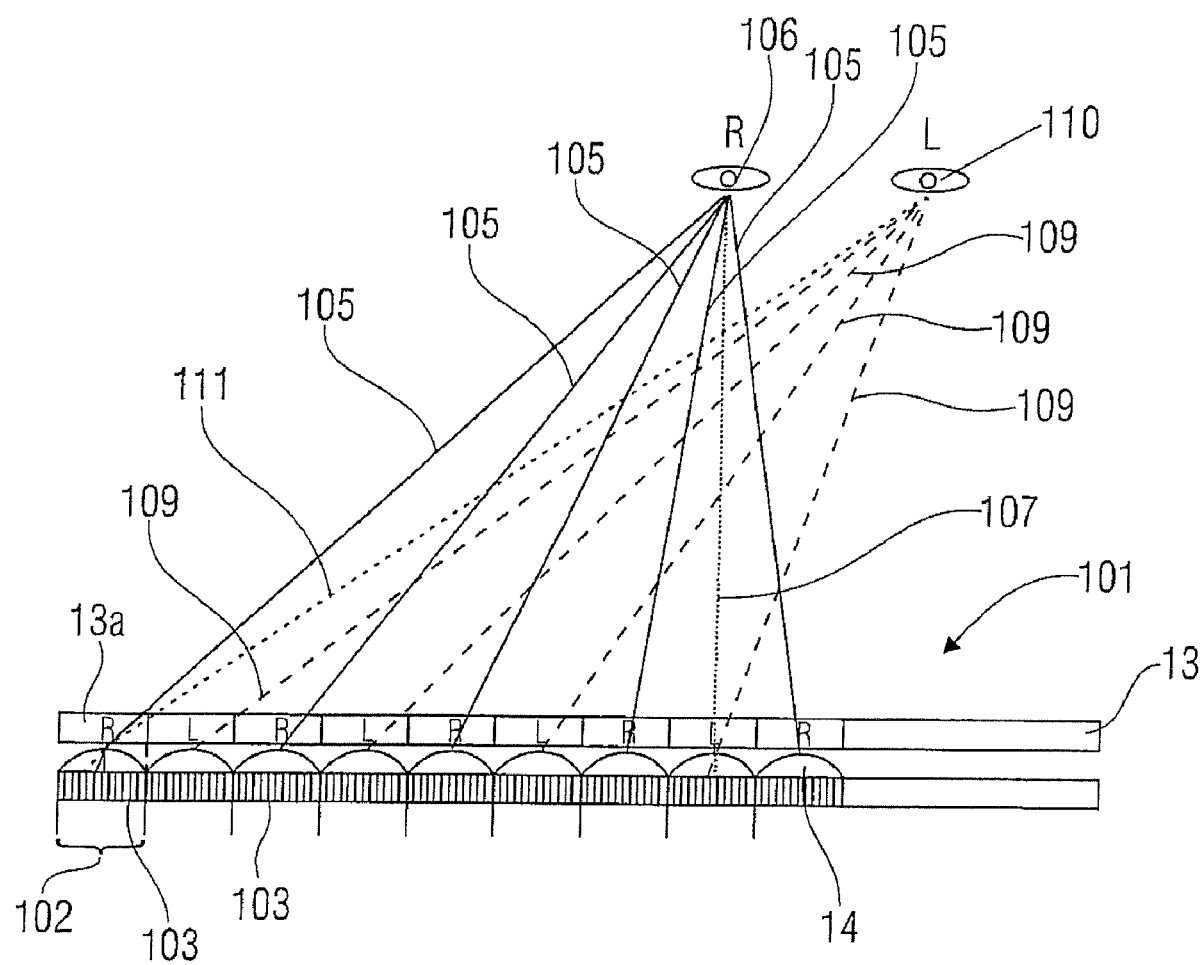
FIG. 9 is a schematic view of the pixel array according to a further embodiment of the present invention causing a three-dimensional color image for an observer.

FIG. 9 illustrates a further embodiment of the pixel array 101. The difference to the pixel array 101 shown in FIG. 8 is that, in FIG. 9, in the row of the main pixels 102, the main pixels belonging to a superpixel are no longer arranged side by side. Instead, the superpixel structure has now also been broken up, so that the main pixel 102 causing a color picture point in the right eye lens 106 is arranged next to a main pixel causing a color picture point in the left eye lens 110. In other words, for example, the main pixel 102 generating a blue picture point in the left eye lens of the observer is arranged next to the main pixel 102 generating a green picture point in the right eye lens of the observer. Thus, the so-called interlaced mode according to which the stereo sub-images are caused in the right eye lens 106 and in the left eye lens 110 may be broken down to the sub-pixel level, i.e. the superpixel structure is broken up so that a sub-pixel outputting a color light beam for the generation of a color picture point and/or sub-picture point in the right eye is arranged next to a sub-pixel outputting a color light beam for the generation of a color picture point and/or sub-picture point in the left eye.

At this point, it is to be noted that the association of the respective main pixels 102 with the superpixels may be changed only by a suitable driving of the OLED strips in the sub-pixel areas. In other words, the configuration of the pixel array 101 shown in FIG. 8 may be adapted only by a change of the function of the control means so that the result is the configuration of the pixel array 101 explained in FIG. 9. This means that, for example in a control means having a computer core processing a corresponding software, the reconfiguration may be performed only by a changed driving of the OLEDs, which may be implemented in the software. Thus, no complex changes in the hardware are necessary to change the configuration of the pixel array shown in FIG. 8 so that it corresponds to the configuration of the pixel array 101 shown in FIG. 9.

The OLED red-green-blue strip structures change in both variants, i.e. both in the pixel array 101 shown in FIG. 8 and in the pixel array 101 shown in FIG. 9, under each sub-pixel and/or main pixel 102, so that the switchability to an unseparated two-dimensional illumination of the display is still possible. Both variants thus allow the separation of the sub-images on the pixel and/or superpixel level and on the sub-pixel level to the respective eye and/or to the respective eye lens. Due to the red-green-blue structure of the superpixels, color filters may be omitted in the shown pixel arrays 101 and the displays in which they are used due to the direct red-green-blue illumination by the OLED structures.

A separation of the stereo sub-images in the respective eye lenses is done in the backlight construction presented here, on the one hand, via the deliberate illumination of the interlaced sub-pixels and, on the other hand, by the deflection behavior of the lens raster arrays put onto the red-green-blue OLED structures, having the hemicylinder-shaped lenses 14. Each individual lens strip of the array has the task to focus the light of the emitting OLED structures and thus to generate an angle-dependent illumination of each individual red-green-blue sub-pixel. This effect leads to a visibility depending on the observation angle and/or adaptivity of the visibility of the illuminated sub-pixels with respect to the location of the respective eye or the respective eye lens caused by the spatial arrangement and the number of the driven emitting OLED strip structures.

By deliberately turning on and/or off certain amounts of emitting red-green OLED structures, a separation of the stereo sub-images in the eyes of an observer is possible by an intelligently drivable OLED backlight. The angle-dependent visibility of the individual red-green-blue backlight structures matching each sub-pixel is determined by the spatially variable OLED strip raster. The perception of all corresponding sub-pixels of a sub-image by one of the two eyes of an observer becomes directly controllable and correctable by the OLED backlight construction. The behavior of the OLED backlight structure may be adapted to the position of the single user by adaptive tracking of a moving single user.

Figure 10:
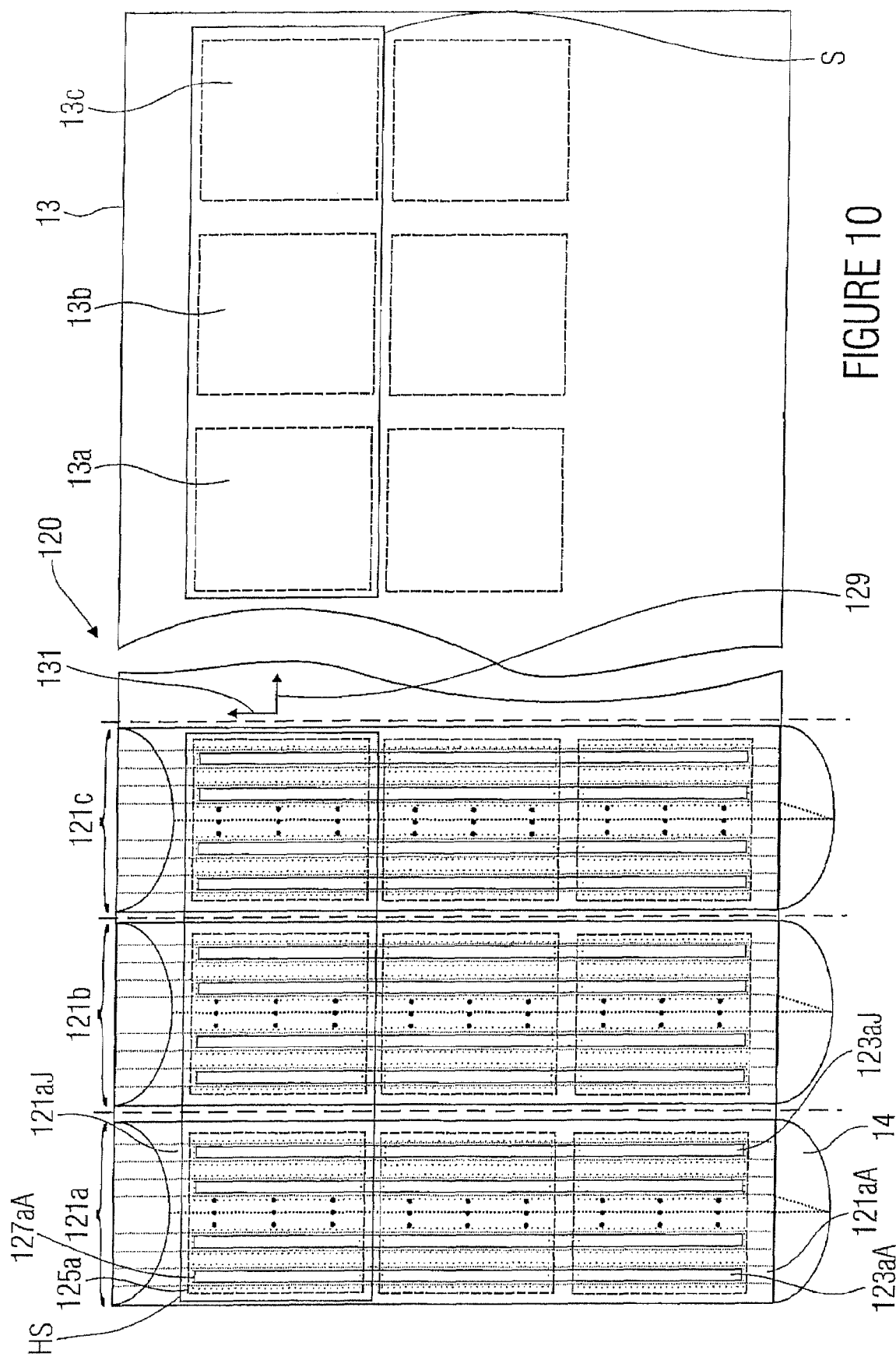
FIG. 10 is a schematic view of a display according to a further embodiment of the present invention.

FIG. 10 shows a schematic view of a display 120 according to an embodiment of the present invention. The display includes the liquid crystal element 13, the lenses 14, and a red main illumination area 121*a*, a green main illumination area 121*b*, and a blue main illumination area 121*c*. Only a section is shown of the main illumination areas 121*a-c*, because the display includes several red, green and blue main illumination areas 121*a-c*, which, however, are not shown for clarity. Also, only a section is shown of the liquid crystal element 13. Both the liquid crystal element and the main illumination areas respectively extend over the whole area and thus conceal each other. The main illumination area 121*a* includes, for example, ten red sub-illumination areas 121*a*A-121*a*J, only four of which are shown here. In each sub-illumination area 121*a*A-121*a*J, there is arranged a red strip-shaped OLED 123*a*A-123*a*J, respectively.

The liquid crystal element 13, only a section of which is shown here, is subdivided into the modulation pixels 13*a-c*, wherein the red modulation pixel 13*a*, the green modulation pixel 13*b* and the blue modulation pixel 13*c* are shown here. A superpixel S consists of the red modulation pixel 13*a*, the green modulation pixel 13*b* and the blue modulation pixel 13*c*.

The red main illumination area 121*a* includes several red main pixel areas 125*a*, wherein the red main pixel areas 125*a* are set so that they are respectively opposite the red modulation pixels 13*a*, at least partially. The same applies to the green main pixel area 125*b* and the blue main pixel area 125*c*.

The red main pixel area 125*a*, the green main pixel area 125*b* and the blue main pixel area 125*c* form a main pixel region HS opposite the superpixel S and thus opposite the red, green and blue modulation pixels.

A transverse direction 129 extends perpendicular to a longitudinal axis 131 of the substantially strip-shaped OLEDs 123*a*A-123*a*J.

The liquid crystal element 13 is located in front of the strip-shaped OLEDs 123*a*A-123*a*J in the emission direction and/or the observer direction, i.e. in a direction of the light beam from the strip-shaped OLEDs 123*a*A-123*a*J towards the observer. The hemicylinder-shaped lenses 14 are respectively located between the main illumination areas 121*a-c* and the liquid crystal element 13.

The control means not shown here activates, for example, the first red strip-shaped OLED 123*a*A so that the red light is emitted in a first direction to a first eye of the observer. When the position of the eye changes, the control means can detect this. For example, the control means may detect that the observer has moved so that the light output by a second red strip-shaped OLED would cause a picture point in an eye of the observer. The control means may subsequently activate, for example, the second red strip-shaped OLED so that the red light is emitted in the second direction to a changed position of the eye of the observer.

In the eye of the observer, the picture points generated by the red main pixel area 125*a*, and by the green main pixel area 125*b* and the blue main pixel area 125*c* mix so that the eye perceives a color picture point. The liquid crystal element 13 modulates its transmission behavior for the light beams output by the OLEDs modulation pixel-wise to adjust the intensity of the color picture point perceived by the observer and the color of the picture point.

In the above embodiments, the light beams output by the OLED strips are deflected by the lenses. However, any beam deflection means are alternatively conceivable for deflecting the beams output by the OLED strips at the sub-pixel areas, such as curved mirrors or prisms. The shape of the lenses may also be varied in any way. A hemispherical and/or spherical segment-shaped implementation of the lenses is also conceivable, which allows a different deflection of the light beams not only in a transverse direction of the OLED strips, but would also additionally allow it along a longitudinal axis of the OLED strips.

In above embodiments, a liquid crystal element is arranged in front of the lens, which is used to modulate the light intensity of the light propagating from the lens towards the observer. However, any transmission means for modulating the intensity of the light of the light propagating from the semicircle lens towards the observer are alternatives and/or the liquid crystal element could also be omitted.

In above embodiments, the light beam causing a picture point in the eye and/or the eye lens of the observer is emitted by an activated OLED strip. However, any luminous elements that may be arranged in the sub-pixel areas and output light beams propagating in the direction of the lenses are conceivable as alternatives.

The luminous elements may also have any emission spectrum or may also emit monochrome light that may then even be converted into color light by the use of color filters. The luminous elements in the sub-areas of a main pixel area preferably have the same emission spectrum, but luminous elements in sub-pixel areas of a main pixel area not having the same emission spectrum are also conceivable as alternatives.

In above embodiments, there may alternatively also be used monochrome luminous elements that may also have a monochrome OLED. The monochrome OLED may comprise a first continuous electrode layer, wherein the OLED strips have been produced by structured depositing of the second electrode layer. The organic layer located between the first electrode layer and the second electrode layer may also be implemented as a continuous organic material and/or a continuous organic layer for emitting and/or for outputting the light beams. The monochrome OLEDs may then be used in combination with color filters to realize color displays. The color filters may also additionally be combined with polarization filters.

In above embodiments, a main pixel area may be subdivided into any number of sub-pixel areas. Also, any number of main pixels is possible in the pixel array in above embodiments to generate an image for the observer. In addition, a modulation pixel is associated with a main pixel and/or a main pixel area, respectively, in the above embodiments, wherein the main pixel area and the modulation pixel are preferably arranged in parallel to each other so that preferably an area of the main pixel is at least 50% of an area of the modulation pixel. However, several main pixels may alternatively also be associated with a modulation pixel.

In above embodiments, a modulation of the transmission behavior of the modulation pixels of the liquid crystal element with respect to the light beams emitted by the pixel arrays is responsible for displaying an image for the observer. However, an image signal may alternatively be received from the control means, and the intensity of the luminous elements in the sub-pixel areas may be modulated depending on the image signal so that an image is displayed for the observer. It is advantageous when the OLED strips arranged in parallel to each other respectively extend only to an adjacent main pixel area in their longitudinal axis in the embodiment shown in FIG. 10 for this purpose.

In above embodiments, the control means is preferably designed so that it is able to perform any determination of the position of an observer or of the eyes, the eye lenses or other body parts of the observer, and is subsequently able to perform individual driving of the OLED strips in the sub-pixel areas. In above embodiments, the control means is, for example, designed so that it may determine the position of an observer with respect to an x-axis parallel to a row of OLED strips and/or parallel to the transverse direction of the OLED strips and with respect to a z-axis perpendicular to the pixel array plane, and therefrom determines a position of the observer. The position determination may be done so that the control means determines an angle enclosed by a straight line through the position of the observer and through a point in the main pixel with a perpendicular onto the pixel array.

In above embodiments, the control means may also determine a plurality of positions of observers or their body parts, for example the eyes. Subsequently, the control means may drive the OLED strips in the sub-pixel areas of a main pixel area so that the observers respectively perceive, for example, a picture point of a first stereo sub-image in the right eye, and it may drive the OLED strips in the sub-pixel areas of another main pixel area so that the observers respectively perceive a picture point of a second stereo sub-image in the left eye. Thus, a plurality of observers respectively perceive a first and a second stereo sub-image in the right and the left eye so that the result is respectively the impression of a three-dimensional image for the observers.

Alternatively, however, there could also be provided main pixel areas in the pixel array that are respectively associated with an eye of an observer. The control means then determines the positions of the observers and drives the OLED strips and/or luminous elements of the respective main pixel areas so that, for example, a first main pixel area generates a picture point of a first stereo sub-image in the right eye of the first observer and a second main pixel area does the same in the right eye of the second observer, respectively, while a third main pixel area generates a picture point of a second stereo sub-image in the left eye of the first observer and a fourth main pixel area does the same in the left eye of the second observer, respectively. The two observers thus respectively have the impression of a three-dimensional image, wherein the perceived three-dimensional images may differ from each other. Although, on the one hand, the resolution of the display in which the pixel array is used is reduced, i.e. halved in the case of two different images, it is possible, on the other hand, to display a three-dimensional image for each observer individually so that the first observer and the second observer may perceive an object, for example, from different perspectives, depending on their position.

The control means may then drive the OLED strips in the sub-pixel areas depending on the position of the observer based on the determined position of the observer. Driving the luminous elements and/or OLED strips in the sub-pixel areas may preferably be done by activating the luminous elements in the sub-pixel areas or deactivating the luminous elements in the sub-pixel areas. Deactivating the luminous elements to suppress a picture point in the eye of the observer allows to achieve maximum integral luminance. In addition to activating or deactivating the OLED strips in the sub-pixel areas, the control means may alternatively also adjust the intensity of the radiation output by the OLEDs.

The control means may preferably drive and/or activate or deactivate the main pixels causing a stereo sub-image in the right eye of the observer and the main pixels causing a stereo sub-image in the left eye of the observer simultaneously. The driving may, for example, be done so that the result is a column-wise interlacing of the right stereo sub-image and/or the left stereo sub-image.

Alternatively, the luminous elements may be driven alternately and/or sequentially in the sub-pixel areas so that the main pixels first cause a stereo sub-image in the right eye and then the main pixels cause a stereo sub-image in the left eye. The right sub-image and/or stereo sub-image in the right eye and the left sub-image and/or stereo sub-image in the left eye then follow each other in turns. Here, the full resolution of the pixel array may be used, because all main pixels generate a stereo sub-image in the right eye and then in the left eye.

In above embodiments, a superpixel preferably comprises a main pixel having a red emission spectrum, a green emission spectrum and a blue emission spectrum, but the most varied color combinations and also any number of main pixels and/or sub-pixels associated with a superpixel are conceivable as alternatives. Also, the arrangement of all main pixels of a superpixel may be done one after the other in a row of main pixels, which is referred to as pixel interlacing. Or the main pixels causing picture points in the right eye and in the left eye of the observer may also be arranged alternately one after the other, which is referred to as superpixel interlacing, so that, in the row of the main pixels, a main pixel generating a picture point in the left eye of the observer is always located next to a main pixel generating a picture point in the right eye of the observer. By suitable red-green-blue structuring of the OLED strips in the sub-pixels associated with a main pixel so that all luminous elements of a sub-pixel associated with a main pixel have the same color spectrum, a color image may be displayed without requiring the use of a color filter.

In the embodiment shown in FIG. 10, a plurality of sub-illumination areas is arranged in a strip-shaped way and in parallel to each other, and the sub-illumination areas respectively have the same shape, but any shapes of the sub-illumination areas and also implementations where they have shapes differing from each other are alternatives, wherein also any number of sub-illumination areas may be associated with a main illumination area. In addition, the subdivision of the main illumination areas into the sub-illumination areas is preferably equal for all main illumination areas, but any subdivisions of the main illumination areas are alternatives.

At the same time, the main pixel areas in FIG. 10 may preferably be implemented rectangular, but their shapes may vary in any way. The superpixel shown in FIG. 10 preferably has a square shape, but any shapes of the superpixel are alternatives.

The arrangement between the main illumination areas and the beam deflection means is also preferably identical and/or equal so that the output radiation of the first sub-illumination areas is deflected into the first equal direction, and the output radiation of the second sub-illumination areas is deflected into the same second direction differing from the first direction, respectively. However, any arrangements of the beam deflection means to the main illumination areas are alternatives.

In the embodiment shown in FIG. 10, the main illumination area having the red luminous elements is respectively arranged between the main illumination area having the green luminous elements and the main illumination area having the blue luminous elements. However, two main illumination areas having the red luminous elements could preferably also be arranged between two main illumination areas having the green luminous elements and two main illumination areas having the blue luminous elements, so that then, for example, the first one of the main illumination areas having the red, the green and the blue luminous elements may cause a picture point in the right eye of the observer, and the second one of the main illumination areas having the red, the green and the blue luminous elements may cause a picture point in the left eye of the observer, respectively.

Preferably, a first primary color, a second primary color and a third primary color are selected for the colors of the luminous elements in the main illumination areas, but any colors are alternatives. Also, any number of main illumination areas having different colors may be arranged in the sequence, so that they mix to a color picture point in the eye of the observer.

In above embodiments, the control means 17 may be implemented as an electronic circuit, such as a logic circuit or a circuit having a processor core processing a software. The control means may comprise a sensor detecting a position of the observer and/or of an eye of the observer or an eye lens or any other body part. For the determination of the eye position, the control means may also comprise an eye position determination means. However, the control means may also be implemented so that it receives a signal giving information on a position of the observer and evaluates it to drive the OLED strips located in the sub-pixel areas.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A pixel array having an illumination device comprising a plurality of main illumination areas subdivided into at least a first and a second sub-illumination area, wherein a luminous element for outputting radiation is arranged on each sub-illumination area, and wherein a beam deflection unit is associated with each main illumination area, the beam deflection unit being designed to deflect the radiation output by the luminous element of the first sub-illumination area into another direction than the radiation output by the luminous element of the second sub-illumination area;
wherein the main illumination area is subdivided into one or more main pixel areas, and correspondingly each sub-illumination area is subdivided into one or more sub-pixel areas, such that one of the luminous elements for outputting radiation is arranged on each sub-pixel area, and that one of the beam deflection units is associated with each main pixel area to deflect the radiation output by the luminous element of the first sub-pixel area of the respective main pixel area into another direction than the radiation output by the luminous element of the second sub-pixel area of the respective main pixel area;
wherein, behind the plurality of the beam deflection units in the emission direction, there is arranged a transmitting unit comprising an array of modulation pixels and being controllable to selectively transmit the radiation output by the luminous element to adjust the intensity of the transmitted radiation; and
wherein exactly one main pixel area is associated with each modulation pixel and vice versa.

2. The pixel array of claim 1, wherein the first sub-illumination area and the second sub-illumination area have the same shape.

3. The pixel array of claim 1, wherein the first sub-illumination area and the second sub-illumination area are implemented in a strip shape and run parallel to each other.

4. The pixel array of claim 1, wherein the subdivision of the main illumination areas into the sub-illumination areas is equal for all main illumination areas, and the arrangement between the beam deflection units and the main illumination areas is equal, respectively, so that the output radiation of the first sub-illumination areas is deflected into the same first direction, and the output radiation of the second sub-pixel areas is deflected into the same second direction differing from the first direction.

5. The pixel array of claim 1, wherein a transmitting unit is arranged in front of the illumination device in the emission direction, which is controllable to selectively transmit the radiation output by the luminous elements to adjust the intensity of the transmitted radiation.

6. The pixel array of claim 5, wherein the transmitting unit comprises a liquid crystal element.

7. The pixel array of claim 5, wherein the transmitting unit is subdivided into a plurality of modulation pixels.

8. The pixel array of claim 1, wherein the luminous elements in the sub-illumination areas associated with a main illumination area have the same emission spectrum.

9. The pixel array of claim 8, wherein luminous elements of the first primary color having a first primary color emission spectrum are arranged on a first one of the main illumination areas having a first plurality of sub-illumination areas, and luminous elements having a second primary color emission spectrum differing from the first emission spectrum are arranged on a second one of the main illumination areas having a second plurality of sub-illumination areas, and luminous elements having a third primary color emission spectrum differing from the first emission spectrum and the second emission spectrum are arranged on a third one of the main illumination areas having a third plurality of sub-illumination areas, wherein the first main illumination area, the second main illumination area and the third main illumination area form a superpixel area of a superpixel array, wherein the main pixel areas are arranged such that, in one direction, a sequence of the main illumination areas corresponds to a repetitive arrangement of a main illumination area having the luminous elements of the first primary color, a main illumination area having the luminous elements of the second primary color, and a main illumination area having the luminous elements of the third primary color.

10. The pixel array of claim 8, wherein luminous elements of the first primary color having a first primary color emission spectrum are arranged on a first one and on a second one of the main illumination areas having a first and a second plurality of sub-illumination areas, and luminous elements having a second primary color emission spectrum differing from the first emission spectrum are arranged on a third one and on a fourth one of the main illumination areas having a third and a fourth plurality of sub-illumination areas, and luminous elements having a third primary color emission spectrum differing from the first emission spectrum and the second emission spectrum are arranged on a fifth one and on a sixth one of the main illumination areas having a fifth and a sixth plurality of sub-illumination areas, so that, in one direction, a sequence of the main illumination areas corresponds to a repetitive arrangement of a first and a second main illumination area having the luminous elements of the first primary color, a third and a fourth main illumination area having the luminous elements of the second primary color, and a fifth and a sixth main illumination area having the luminous elements of the third primary color, to achieve a pixel interlacing arrangement in the illumination device.

11. The pixel array of claim 1, designed to generate a three-dimensional image for an observer of the display.

12. The pixel array of claim 1, designed to generate a three-dimensional image for a first observer of the display and to generate a three-dimensional image for a second observer, wherein the first observer is spaced apart from the second observer.

13. The pixel array of claim 1, wherein the luminous element is an OLED.

14. The pixel array of claim 1, wherein the luminous element is deposited on a substrate in a structured way.

15. The pixel array of claim 1, wherein a plurality of OLEDs is arranged on a plurality of the sub-illumination areas, wherein the plurality of OLEDs is monochrome and comprises a first common continuous electrode and a continuous organic layer extending across the plurality of OLEDs and comprises a plurality of second electrodes that have been produced by structured depositing, wherein the organic layer is arranged between the first electrode and the second electrode.

16. The pixel array of claim 1, wherein the beam deflection unit comprises a lens, wherein the lens is implemented in the shape of a cylinder subsegment and particularly in the shape of a hemicylinder.

17. The pixel array of claim 1, wherein the beam deflection unit is implemented in a strip shape.

18. The pixel array of claim 1, wherein the beam deflection unit comprises a lens, wherein the lens is implemented in the shape of a spherical segment.

19. The pixel array of claim 18, comprising a control unit designed to determine an observer position of an observer of an image generated by the radiation output by the luminous elements, and to drive the luminous element of the first sub-pixel area or the luminous element of the second sub-pixel area depending on the observer position.

20. The pixel array of claim 1, wherein each main pixel area comprises a plurality of sub-pixel areas including the first and the second sub-pixel area, wherein the plurality of sub-pixel areas are formed along a longitudinal axis in substantially a strip shape, and the sub-pixel areas are parallel to each other and are arranged next to each other in a transverse direction, wherein the pixel array comprises a control unit designed to determine an angle for a predetermined main pixel area depending on a signal indicating an observer position with respect to the transverse direction as an x-axis and with respect to a z-axis perpendicular to a pixel array plane subtended by the x-axis and the longitudinal axis, the angle indicating an angle enclosed by a perpendicular onto the pixel array plane running through the predetermined main pixel area and a straight line through the position of the observer and a point of the predetermined main pixel area, and to drive the luminous elements of the first and the second sub-pixel area depending on the value of the angle.

21. The pixel array of claim 20, wherein the control unit is designed to perform the determination of the angle for each predetermined main pixel area.

22. The pixel array of claim 1, comprising a control unit designed to determine a first eye position of a first eye and a second eye position of a second eye of the observer and to drive the luminous elements of the first sub-pixel area and the second sub-pixel area depending on the first eye position and the second eye position.

23. The pixel array of claim 22, wherein each main pixel area comprises a plurality of sub-pixel areas including the first and the second sub-pixel area, wherein the plurality of sub-pixel areas are formed along a longitudinal axis in substantially a strip shape, and the sub-pixel areas are parallel to each other and are arranged next to each other in a transverse direction, wherein the control unit is designed to determine the first eye position and the second eye position with respect to the transverse direction as an x-axis and with respect to a z-axis perpendicular to a pixel array plane subtended by the x-axis and the longitudinal axis, and to drive the luminous elements of the first sub-pixel area and the second sub-pixel area depending on the first eye position and the second eye position.

24. The pixel array of claim 21, wherein the control unit is designed to determine a first eye position angle indicating an angle enclosed by a perpendicular onto the pixel array plane running through a predetermined main pixel area and a straight line through the first eye position and a point of the predetermined main pixel area, and a second eye position angle indicating an angle enclosed by a perpendicular onto the pixel array plane running through a predetermined main pixel area and a straight line through the second eye position and a point of the predetermined main pixel area, and to drive the luminous elements of the first sub-pixel area and the second sub-pixel area depending on the value of the first eye position angle and the second eye position angle.

25. The pixel array of claim 1, wherein the plurality of main pixel areas is subdivided into a first group of main pixel areas and a second group of main pixel areas, wherein the pixel array comprises a control unit designed to drive the sub-pixel areas belonging to the first group of main pixel areas so that the sub-pixel areas generate a first stereo sub-image in a first eye of the observer, and to drive the sub-pixel areas belonging to the second group of main pixel areas so that the sub-pixel areas generate a second stereo sub-image in a second eye of the observer, so that the observer perceives a three-dimensional image.

26. The pixel array of claim 25, including the first group of main pixel areas and the second group of main pixel areas, wherein the control unit is designed to adjust the sub-pixel areas belonging to the first group of main pixel areas so that the sub-pixel areas generate a first stereo sub-image in a first eye of a first observer and a first eye of a second observer, and to drive the sub-pixel areas belonging to the second group of main pixel areas so that the sub-pixel areas generate a second stereo sub image in a second eye of the first observer and in a second eye of the second observer, so that the first observer and the second observer perceive a three-dimensional image.

27. The pixel array of claim 25, wherein the control unit is designed to simultaneously drive the luminous elements of the sub-pixel areas belonging to the first group of main pixel areas and the luminous elements of the sub-pixel areas belonging to the second group of main pixel areas.

28. The pixel array of claim 25, wherein the control unit is designed to alternately drive the luminous elements of the sub-pixel areas in each main pixel area so as to generate the first stereo sub-image in the first eye of the observer, and drive the luminous elements of the sub-pixel areas so as to generate the second stereo sub-image in the second eye of the observer, so that the observer perceives the three-dimensional image.

29. The pixel array of claim 1, having a control unit designed to set a first sub-pixel area in the main pixel area which is arranged so that the output radiation of the luminous element arranged thereon is deflected in a direction or to a position of a first eye of an observer, and to set a second sub-pixel area which is arranged so that the output radiation of the luminous element arranged thereon is deflected in a direction or to a position of a second eye.

30. The pixel array of claim 29, wherein the control unit is designed to activate the luminous element arranged on the first sub-pixel area to generate a picture point in the first eye of the observer, or to activate the luminous element arranged on the second sub-pixel area to generate the picture point in the second eye of the observer.

31. The pixel array of claim 29, wherein the control unit is designed to deactivate the luminous element arranged on the first sub-pixel area to suppress a picture point in the first eye of the observer, or to deactivate the luminous element arranged on the second sub-pixel area to suppress the picture point in the second eye of the observer.

32. The pixel array of claim 1, having a driving unit designed to receive a signal displaying an image and to modulate, in units of the modulation pixels, the radiation output by the luminous elements such that the image is displayed.

33. The pixel array of claim 1, wherein the luminous elements are arranged substantially parallel to each other, and a row of the modulation pixels is arranged substantially parallel to a row of the luminous elements.

34. The pixel array of claim 1, wherein all luminous elements of the sub-pixel areas associated with the main pixel area are designed to have an equal emission spectrum.

35. The pixel array of claim 1, wherein the main pixel areas are subdivided into two groups, wherein the first group is provided to generate an image in a first eye for the observer, and the second group is provided to generate an image in a second eye for the observer, and wherein all main pixel areas of a superpixel belonging to the first group are arranged in a row directly following one after the other, and all main pixel areas of the superpixel belonging to the second group are arranged in the row directly consecutive one after the other.

36. The pixel array of claim 1, wherein the main pixel areas are subdivided into two groups, wherein the first group is provided to generate an image in a first eye for the observer, and the second group is provided to generate an image in a second eye for the observer, and wherein the main pixel areas are arranged in a row so that, in the row, the main pixel area of a superpixel belonging to the second group is arranged next to the main pixel area of a superpixel belonging to the first group, and in a further succession of the row, the main pixel area of the superpixel belonging to the first group is arranged next thereto.

37. The pixel array of claim 1, wherein the subdivision of each main pixel area into the first and the second sub-pixel area is equal, so that a direction into which the radiation output by the first sub-pixel area is deflected is equal for all main pixel areas, and a direction into which the radiation output by the second sub-pixel area is deflected is equal for all main pixel areas.

38. The pixel array of claim 1, comprising a control unit designed to adjust a radiation intensity of the luminous elements of the respective main pixel areas in units of the main pixel areas depending on a signal displaying an image, or to modulate the radiation output by one or more luminous elements of the respective main pixel area in units of the main pixel areas or in units of modulation pixel areas into which the main pixel areas are subdivided, such that the image is displayed.

39. The pixel array of claim 1, wherein the pixel array comprises a plurality of sub-pixel areas including the first and the second sub-pixel area for each of the main pixel areas, wherein the pixel array is designed to activate one or more of the luminous elements of the sub-pixel areas of the respective main pixel areas depending on a signal indicating an observer position or an observer direction for each main pixel area, and to deactivate one or more of the luminous elements of the sub-pixel areas of the respective main pixel areas, such that the image is not visible in the observer position or in the observer direction, or to activate one or more of the luminous elements of the sub-pixel areas of the respective main pixel areas, and to deactivate one or more of the luminous elements of the sub-pixel areas of the respective main pixel areas, such that the image is visible in the observer position or in the observer direction.

* * * * *